United States Patent
Cheng

[11] Patent Number: 5,825,950
[45] Date of Patent: *Oct. 20, 1998

[54] OPTICAL ISOLATOR

[75] Inventor: Yihao Cheng, Kanata, Canada

[73] Assignee: JDS Fitel Inc., Nepean, Canada

[*] Notice: This patent issued on a continued prosecution application filed under 37 CFR 1.53(d), and is subject to the twenty year patent term provisions of 35 U.S.C. 154(a)(2).

[21] Appl. No.: 647,596

[22] Filed: May 13, 1996

[51] Int. Cl.$^6$ .................................................. G02B 6/26

[52] U.S. Cl. .................. 385/27; 385/34; 385/43; 372/703

[58] Field of Search .................. 385/27, 33, 34, 385/35, 43; 372/703

[56] References Cited

U.S. PATENT DOCUMENTS

| 5,446,578 | 8/1995 | Chang et al. | 359/282 |
| 5,642,447 | 6/1997 | Pan et al. | 385/34 |
| 5,642,448 | 6/1997 | Pan et al. | 385/34 |
| 5,652,814 | 7/1997 | Pan et al. | 385/34 |

*Primary Examiner*—John Ngo
*Attorney, Agent, or Firm*—Neil Teitelbaum & Associates

[57] ABSTRACT

An optical isolator for passing light in a forward direction with greater intensity than reverse directed light, is provided. The device includes a conventional isolating means having at least two birefringent crystals, and a non-reciprocal rotating element disposed between the two crystals. The isolating means is disposed between two substantially collimating GRIN lenses, and a thermally expanded core (TEC) output optical fiber is coupled to one of the two lenses and an optical fiber having a thermally expanded core optically coupled to the other of the two collimating lenses. Unwanted reflected incident light is poorly coupled into the input TEC optical fiber due the angle of incidence at the fiber end.

12 Claims, 5 Drawing Sheets

FORWARD

REVERSE

COUPLING LOSS: $\cos^2(d_{f1}) * \cos^2(d_{f2})$

ISOLATION: $\sin^2(d_{f1}) * \sin^2(d_{f2})$

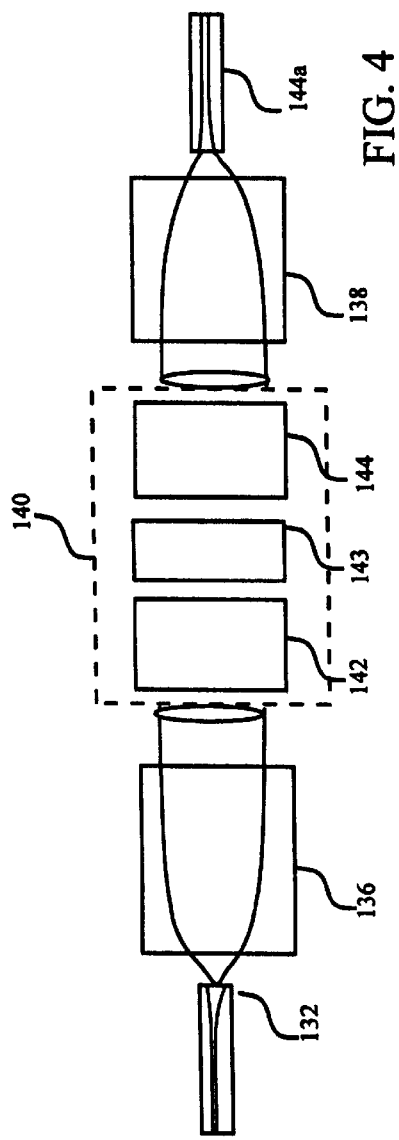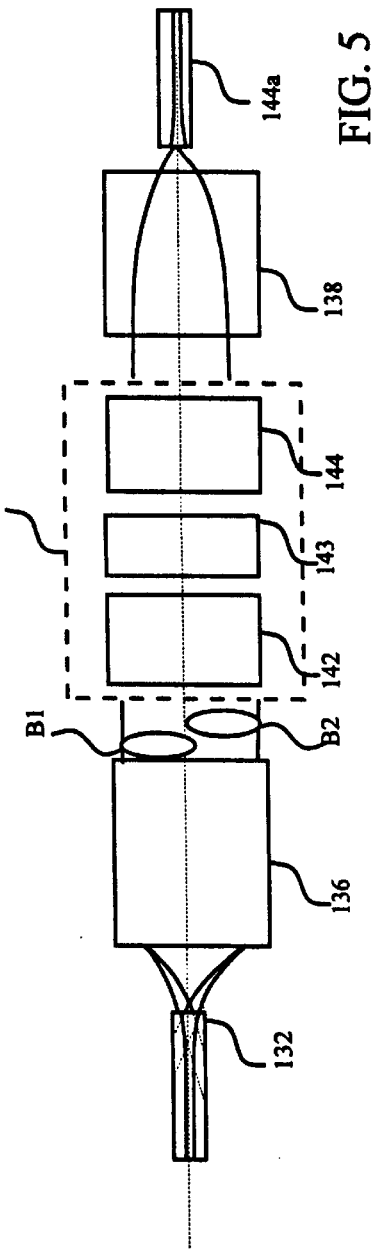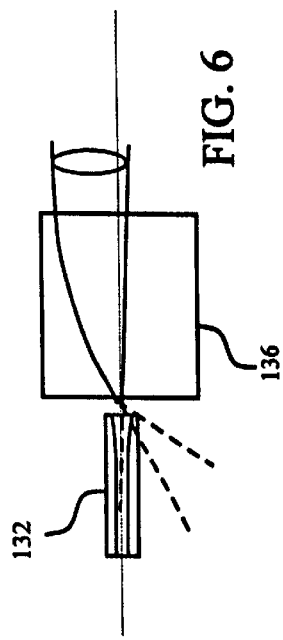

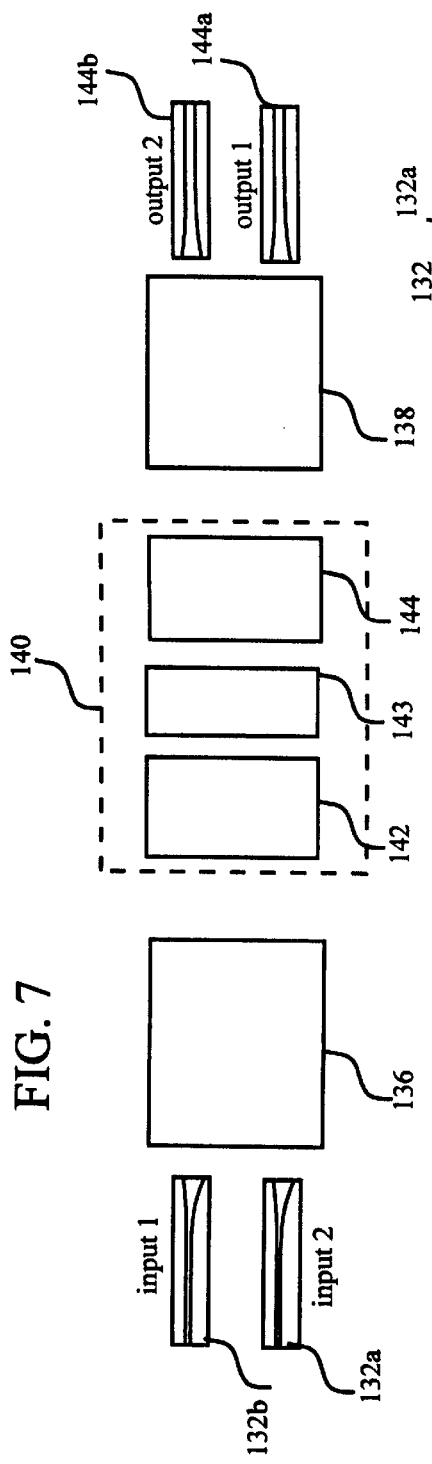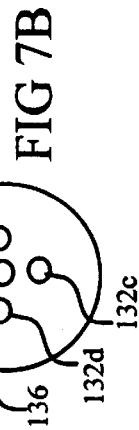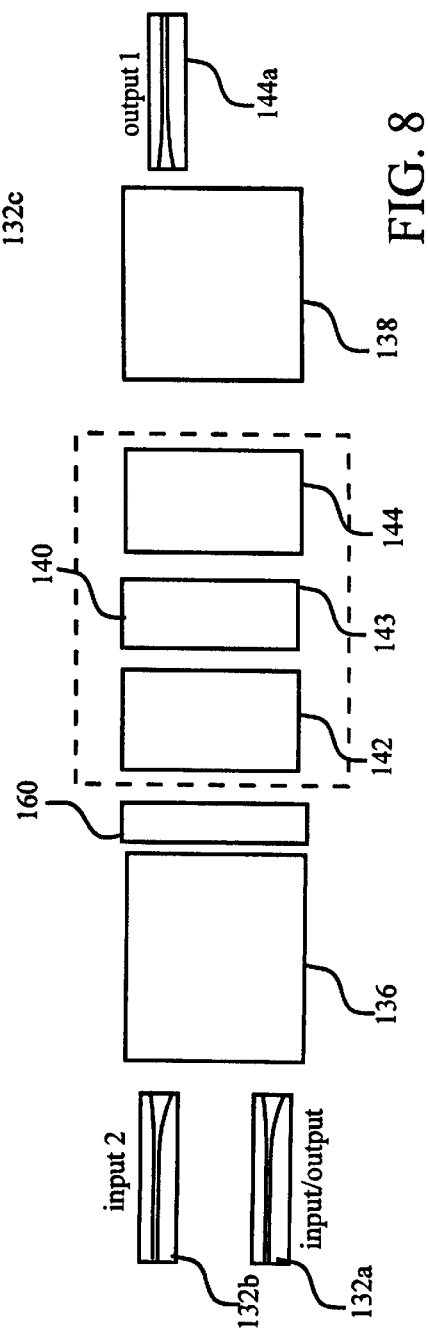

OPTICAL ISOLATOR

FIELD OF THE INVENTION

This invention relates generally to polarization independent optical isolators and in particular to a polarization independent optical isolating element that is coupled to an optical fibre having a thermally expanded core (TEC).

BACKGROUND OF THE INVENTION

The use of optical fibres in communications has developed rapidly in recent years; and, with such progress, new problems have arisen. When a light source transmits light through an optical fibre to another optical device, some of the light transmitted through the optical fibre will be reflected by an end face of the fibre or other parts of the optical device at the other end, so that such reflected light returns to the light source. Multiple reflections at the end faces of optical fibres or other optical devices can cause echoes. These effects adversely affect the performance of the source and compromise the information communicated in the fibre.

Various optical isolators and non-reciprocal devices have been developed to overcome the problem of light reflections and echoes described above. One such device is described in U.S. Pat. No. 5,446,578 in the name of Chang et al. In other isolator devices wedges are used, such as in U.S. Pat. No. 4,548,478 to Shirasaki. While the optical isolators described in the aforementioned patent are effective in overcoming the problem of light reflections or echoes, such devices may give rise to other problems; these problems are described in U.S. Pat. No. 5,446,578 concerning the earlier '478 patent. Although the patent of Chang et al. attempt to overcome problems associated with the prior art, the device proposed by Chang et al., for example shown in FIG. 7 of the '578 patent and labeled FIG. 1 here, can further be improved.

It is therefore an object of this invention to provide an optical isolator that provides substantial isolation and which at the same time is relatively simple and cost effective to manufacture.

It is a further object of the invention to provided an optical isolator that utilizes parallel faced birefringent crystals and that lessens the power spectral density through the crystals and non-reciprocal isolating elements.

SUMMARY OF THE INVENTION

In accordance with the invention there is provided, an optical isolator for passing light in a forward direction with greater intensity than reverse directed light. The device comprises an isolating means comprising at least two birefringent crystals, and a non-reciprocal rotating element between the two crystals. The isolating means is disposed between two substantially collimating lenses. An optical fibre having a thermally expanded core is optically coupled to the first collimating lens.

In accordance with the invention there is further provided an optical isolator for passing light in a forward direction with greater intensity than reverse directed light, comprising: input and output thermally expanded core optical fibres optically aligned and spaced apart; first and second spaced apart collimating lenses disposed between and optically coupled with the expanded core optical fibres; and, isolating means disposed between the spaced apart collimating lenses, said isolating means including two birefringent crystals each having parallel end faces, and non-reciprocal rotating means between the two birefringent crystals.

In accordance with the invention there is provided an optical isolator for passing light in a forward direction with greater intensity than reverse directed light, comprising: an isolating means having at least two birefringent crystals, and a non-reciprocal rotating element disposed between the two crystals, the isolating means being disposed between two lenses each for providing a substantially collimated beam of light at an adjacent end of the isolating element; an output optical fibre coupled to one of the two lenses and an input optical fibre having a thermally expanded core optically coupled to the other of the two collimating lenses.

Advantageously, the invention provides a device that allows a plurality of optical signals to be launched into the device simultaneously via different TEC fibres coupled to an input end of the device. The optical signals are removed or extracted from the device by providing a same number of TEC output fibres coupled to an output end of the device.

Conveniently one or more optical elements can be inserted between a lens at the input (or output) to provide a tapping or WDM function

BRIEF DESCRIPTION OF THE DRAWINGS

Exemplary embodiments of the invention will now be described in accordance with the following drawings, in which:

FIG. 4 is a side view of an array of elements constituting an optical isolator in accordance with this invention wherein light is launched into the input end and is propagating in direction toward the output end;

FIG. 5 is a side view of the optical isolator shown in FIG. 4, wherein the unwanted reflected light is shown propagating backwards toward the input end; and, FIG. 6 is an illustration of a beam of light incident upon an end of a TEC fibre at a steep angle; and, FIG. 7 is a side view of an alternative embodiment of this invention wherein a plurality of input and output fibres are present effectively providing isolation for separate input and output channels using a single device;

FIG. 7B is an end view of optical fibres disposed about the axis of a GRIN lens wherein one optical fibre is disposed on the optical axis; and, FIG. 8 is a side view of an alternative embodiment of this invention incorporating a filter into this device.

DETAILED DESCRIPTION

Figure 1:
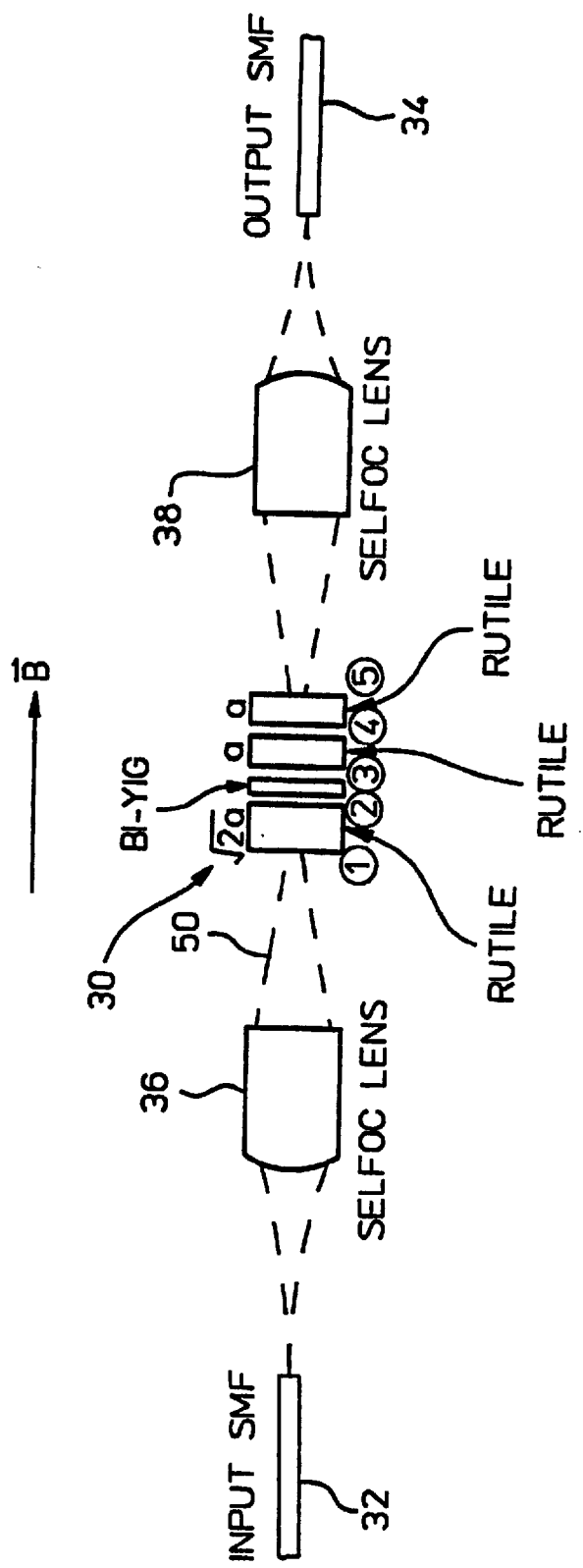
FIG. 1 is a side view of an array of elements constituting an optical isolator to illustrate a conventional optical isolator.

This invention utilizes a beam expanding fibre with known optical components to provide a novel optical isolator. A conventional beam expanding fibre is disclosed in a reference entitled "Beam Expanding Fibre Using Thermal Diffusion of the Dopant" in Journal of Lightwave Technology. Vol. 8, No. 8 August 1990. The beam expanding fibre of the above reference has a core whose index of refraction is determined by the dopant e.g., Ge, that is thermally diffused so that a spot size of the fundamental mode, which corresponds to "mode-field diameter of the optical fibre", is partially expanded.

It is known that by increasing the mode field diameter at the end of the optical fibre as shown in the above reference, it is possible to insert a lensless optical device between the fibres with the expanded mode fields without significant loss increase. Furthermore, mode field expanded fibre is becoming of interest and useful for matching two dissimilar optical fibres. This invention utilizes these and another property relating to the acceptance angle of TEC fibre to provide an efficient and useful optical isolator.

One of the more ubiquitous building blocks used in the design and manufacture of optical elements is the GRIN lens. A preferred embodiment of this invention comprises two substantially collimating GRIN lenses, one about the input end and one about the output end of the device. Lenses of this type are produced under the trade name "SELFOC"; the mark is registered in Japan and owned by the Nippon Sheet and Glass Co. Ltd. GRIN lenses in combination with other optical elements are used in the manufacture of WDM devices, optical couplers, circulators, isolators, and other devices.

An impetus for utilizing a expanded core diameter optical fibre having a large mode field, is its related small numerical aperture (NA). Numerical aperture is inversely proportional to the square root of the core diameter. A consequence of a smaller NA is a smaller angular divergence of an output beam exiting the end-face of the small core diameter optical fibre and more importantly, a small or low angular acceptance of that fibre to light at its expanded core end face. It will later become evident that by ensuring that any unwanted light returning through the optical isolating element is substantially shifted, and therefore is translated via the input collimating lens into a substantially large angle directed towards the input TEC optical fibre, that this light incident upon the TEC optical fibre end face at a high angle, will not be substantially coupled back into the input TEC optical fibre.

In addition to this aforementioned benefit of utilizing TEC fibre, other inherent benefits are present. Firstly, alignment tolerance can be more lax when coupling light for example, in the forward direction through the output collimating lens to the output receiving TEC optical fibre in this invention, than to a small diameter core optical fibre; and as well, spherical aberration associated with GRIN lenses and small core diameter optical fibres is substantially reduced when coupled alternatively to a TEC fibre. This is described in more detail in U.S. patent application Ser. No. 08/462149 in the name of K. Abé.

Referring now to FIG. 1, a side view of an array of elements forming a conventional polarization independent optical isolator are shown. An isolator 30 is placed between an input single mode fibre 32 and an output single mode fibre 34, and self focusing lenses 36, 38 for focusing the light between the two fibres and the isolator. Isolator 30 operates to permit transmission of light in the forward direction from fibre 32 to fibre 34. Any light originating or reflecting from fibre 34 is greatly reduced in amplitude by the isolator 30 when it is transmitted in the reverse direction to input fibre 32. The operation of the isolator 30 will be explained in reference to FIGS. 2A to 2C below.

Figure 2A:
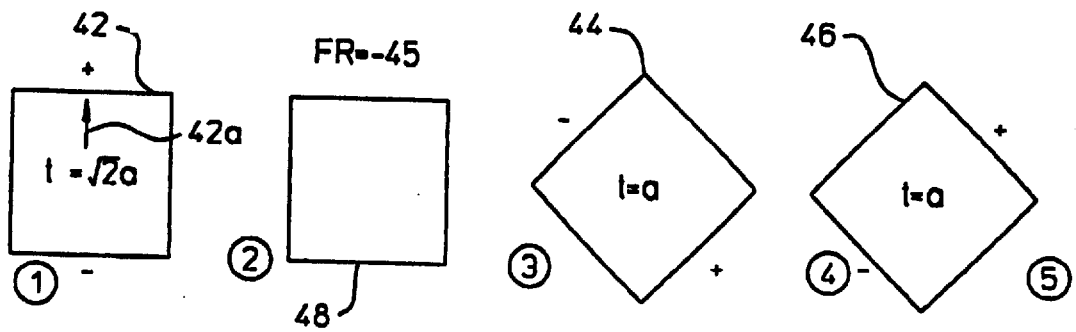
FIG. 2A are cross sectional views of the four elements of FIG. 1, where the cross-sectional views are arranged side-by-side in the same order as in the array and in the forward direction to illustrate the isolator of FIG. 1.

FIG. 2A shows cross sectional views of the elements 42, 48, 44, 46 taken along planes perpendicular to the path of beam 50 in the forward direction of the beam, where the views are arranged in the same order as in the array of FIG. 1 in the forward direction to illustrate the invention. The walk off directions of (walk of crystal) members 42, 44, 46, are shown by the (+) and (−) signs where walk off direction for light traveling in the forward direction is from the (−) to the (+) in the figure. For light traveling in the reverse direction, the walk off direction is from (+) towards (−) in the figure. As used in this application, a walk off crystal is one which causes rays with their planes of polarization parallel to the walk off direction to walk off in the walk off direction, but which leaves rays with planes of polarization orthogonal to the walk off direction unchanged in their direction. Element 48 is a non-reciprocal rotation element such as a Faraday rotator which rotates the polarization of any light passing therethrough counterclockwise by approximately 45 degrees. This is illustrated in FIG. 2A by the equation FR=−45, where the (−) sign indicates rotation in the counterclockwise direction when viewed in the forward direction. Therefore when viewed in the forward direction, member 44 is rotated by 135 degrees clockwise relative to crystal 42 and crystal 46 is rotated by 45 degrees clockwise relative to crystal 42.

The walk off direction of member 42 is the forward direction is shown by arrow 42a, pointing from the (−) sign towards the (+) sign as shown in FIG. 2A. The walk off directions in the forward direction of members 44,46, also point from the (−) sign towards the (+) sign.

Figure 2B:
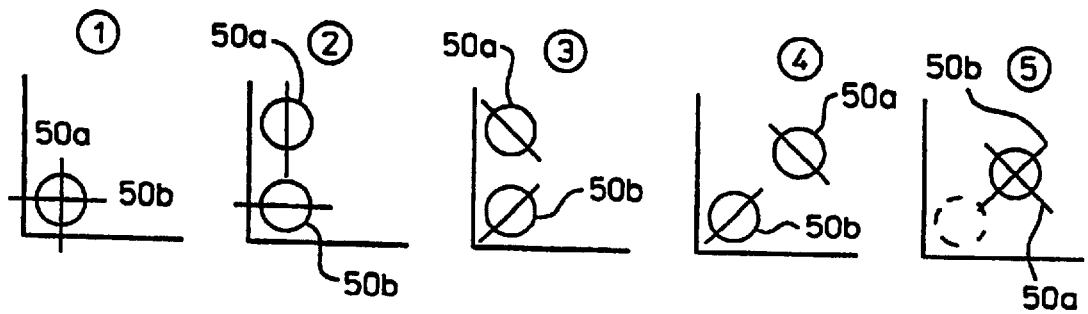
FIGS. 2B, 2C illustrate the positions of side rays passing through the optical isolator of FIGS. 1, 2A in the forward and reverse directions respectively.

In reference to FIG. 1, if beam 50 at position in the forward direction passes through isolator 30 to emerge at position 5. The effect of isolator 30 on beam 50 is illustrated in FIG. 2B. Positions 1 through 5 in FIG. 2B identify the effects on beam 50 of isolator 30 at each stage during the passage of beam 50 and correspond to positions 1 thorough 5 in FIGS. 2A. As shown in FIG. 2b, beam 50 impinges on member 42 at position 1 and emerges at position 2 in two rays 50a 50b where ray 50a has a polarization substantially parallel to 42a and ray 50b has a polarization substantially orthogonal to direction 42a. The two rays are rotated by Faraday rotator 48, so that their planes of polarization are shown in position 3 in FIG. 2B. The two rays then impinge upon member 44 so that ray 50a again diverges so that the positions of the two rays are as illustrated in position 4 in FIG. 2B. Member 46 causes ray 50b to walk off so that the two rays again superpose at position 5. In such manner isolator 30 causes the two rays to superpose each other when emerging from the isolator. In reference to FIG. 2b, the sum of the squares of components 50a and 50b at position 1 is the same as that at position 5, ignoring errors introduced by the rotator 48. Therefore, in the forward direction, the input power of the beam is the same as the output beam. There, isolator 30 is a polarization independent isolator.

Figure 2C:
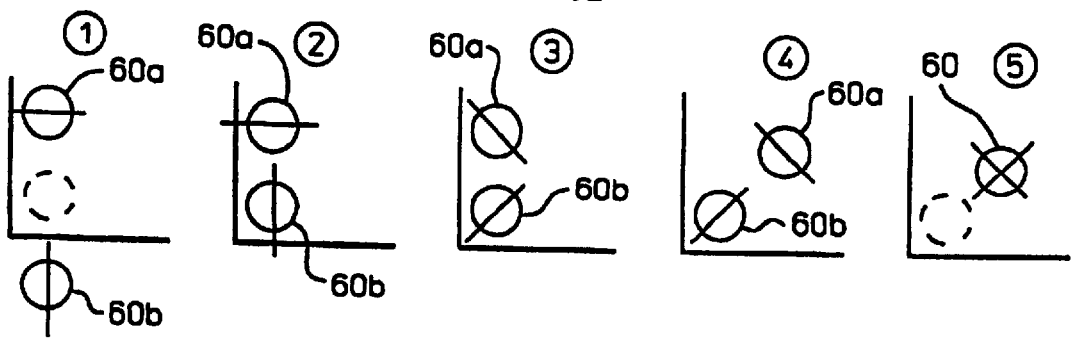

FIG. 2C illustrates the position of beam 60 traveling in the reverse direction from position 5 towards position 1. In FIGS. 2C, 8B, 8C, and 9C, the location of the input optical fibre is shown as a dashed circle to facilitate recognition of the relative location of the various optical beams in relation to the lateral position of the input optical fibre. As shown in FIG. 2C, beam 60 emerges from member 46 as two rays 60a, 60b. Member 44 further causes ray 60a to walk off so that the position of the two rays are as shown in position 3 in FIG. 2C. Faraday rotator 48 rotates the two rays in a counter-clockwise direction by about 45 degrees. Member 42 causes ray 60b to walk off so that the positions of the two rays are as shown in position 1 in FIG. 2C. From FIG. 2C, it is evident that the positions of the two rays 60a 60b walk away from the original forward traveling direction of beam 50. For this reason, lens 36 of FIG. 1 will not focus beam 60 at the end surface of input fibre 32. In other words, light traveling in the reverse direction from fibre 34 towards fibre 32 will not enter fibre 32. Hence isolator 30 permits light to be transmitted from fibre 32 to fibre 34 in the forward direction while minimizing the polarization dependence of output power but eliminates or greatly reduces the amount of light traveling in the reverse direction from fibre 34 towards fibre 32. What has been described so far is the action of the a conventional polarization independent isolator.

U.S. Pat. No. 5,446,578 attempts to correct for an optical path length difference by the walk off crystals 42, 44, and 46 between the rays 50a and 50b.

Figure 3A:
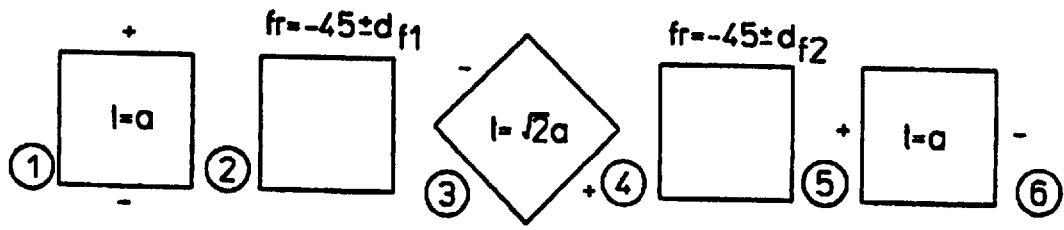
FIG. 3 is a side view of an array of elements constituting an alternative embodiment of an optical isolator to illustrate a conventional optical isolator having improved characteristics over the isolator shown in FIG. 1.
Figure 3B:
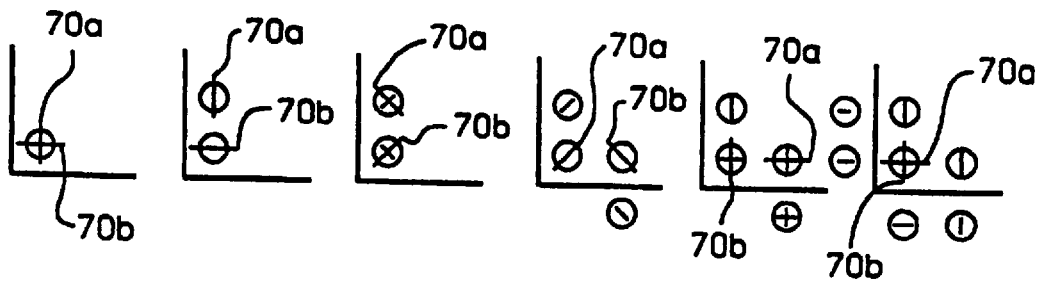
Figure 3C:
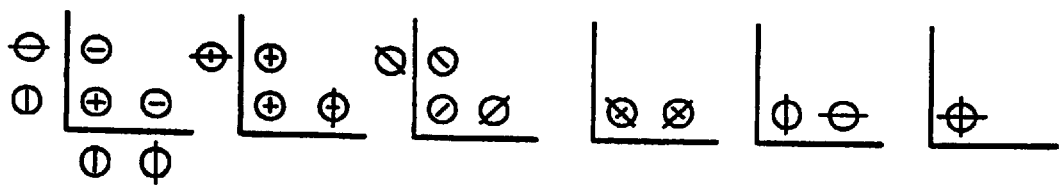

The prior art conventional polarization independent isolator described heretofore, and the improved optical isolator described in U.S. Pat. No. 5,446,578 provide focusing lenses which focus the incoming beam received from the input optical fibre, inside the isolating portion of the device. This is shown in FIG. 1 and FIG. 3, where self focusing lens 36 directs the incoming beam and reduces its diameter as it enters the isolating portion of the device. If the beam was not substantially focused and instead was substantially collimated, (the rays being substantially parallel,) these devices would not provide the desired degree of isolation, and would allow unwanted coupling of returning light into the input optical fibre. However, because the light is focused in this manner, it is directed from the input fibre 32 to the output fibre 34 and any reflected portion of the input light is mis-aligned with the input fibre 34.

Notwithstanding, one primary disadvantages of providing a substantially focused beam in the attenuating portion of an isolating device is in a resulting high optical power density of the focused beam. It is well known for example, that optical components can become damaged and less effective by applying an optical signal with a power density that is too high.

In contrast, the isolator in accordance with this invention, shown in FIG. 4, lessens or obviates this problem by providing a substantially collimated beam to the isolating portion of the device, wherein the beam has a substantially lower power density than the focused beam of the prior art. Turning now to FIG. 4 the optical isolator comprises an isolating means 140 capable of splitting an incoming beam into its two orthogonal polarization components. The means 140 in this exemplary embodiment is comprised of but not limited to two birefringent crystals 142 and 144, having a non-reciprocal rotating means in the form of a Faraday rotating element 143 disposed therebetween. Alternatively, the isolating means described heretofore in the prior art may be used. Essentially, the means 140 must split the beam into two beams having orthogonal polarization states, shift the beams accordingly, rotate the beams by a non-reciprocal device and then recombine the beams. An input and an output lens 136 and 138 respectively provide a substantially collimated beam at the input side of 140 and focus a substantially collimated beam exiting the output side of 140 at an output TEC fibre 144a having an expanded mode field diameter of about 30 μm. An input TEC fibre 132 provides the input beam to the lens 136. Although it is not essential, it is preferred for the input and output TEC fibres 132 and 134 to have compatibly matched mode fields.

The operation of the isolator of FIG. 4 can best be understood with reference to FIGS. 4, 5 and 6. FIG. 4 represents light launched from the input optical fibre 132 in a direction towards the output fibre 134 in the absence of any reflected light traveling backwards towards the input end.

FIG. 5 depicts an instance where light is reflecting backwards towards the input lens 136. In this figure, as the two reflected beams B1 and B2 enter substantially off the optical axis of the lens 136 they are directed and focused toward the end of the TEC fibre 132 at a high incident angle with respect to the longitudinal axis of the fibre. As was pointed out heretofore, since the TEC fibre has a relatively large mode field and small NA and consequently small acceptance angle, most of the light is not efficiently coupled into the fiber 132 and exits out of the core through the cladding. This is illustrated in FIG. 6 where it can be seen that most of the energy of the beam (which has a Gaussian distribution) is incident upon the TEC end at a steep angle and is therefore not coupled into and along the fibre. Any light that is coupled into and that propagates into the fibre 132 is of low intensity.

Referring now to FIG. 7 an alternative embodiment of the invention is shown wherein two TEC fibres 132a and 132b are at an input end of the device 140 located adjacent to the collimating lens 136 juxtaposed about its optical axis. Similarly two TEC output optical fibres 144a and 144b are located adjacent to the output collimating lens 138 however are oriented oppositely to the input TEC fibres about the optical axis. Of course, the number of input and output optical fibres is arbitrary and is a function of particular requirements and available space. For example, five or more input TEC optical fibres may be disposed about and on the optical axis of an input GRIN lens as is shown in FIG. 7B and, similarly, (but not shown) a complementary number and configuration output optical TEC fibres would be coupled to the output lens. Unlike prior art devices that depend upon the position of an unwanted returning beam and the position or location of the input fibre to prevent the coupling of backwards reflecting light, this invention depends on the steep angle at which any returning light is incident upon the TEC fibres, to lessen coupling, and in contrast to the prior art, this invention conveniently provides and embodiment where multiple input output paths through a single device are practicable.

A further extension of this phenomenon is shown in FIG. 8, wherein an optical element 160 is disposed between the input lens 136 and the isolating element 140. By so doing, integration of conventional optical components such as a wavelength division multiplexer/demultiplexor, (WDM/WDDM) filter, or tap coupler is achieved within the isolator shown. In FIG. 8 an input/output port 132a and an input port 132b is provided. In the instance where the optical element 160 is in the form of a WDM filter the operation of the device is as follows. An input light signal $\lambda_1$ is launched into the input/output port 132a and propagates through the isolating device to output port 144a. Light of wavelength $\lambda_2$ is launched into input port 132b and is coupled into the input output port 132a after being reflected by the WDM filter 160. In the instance where the optical element 160 is a filter that is designed to allow a portion of an input light signal $\lambda_1$ to pass therethrough and reflects a portion of the input light signal $\lambda_1$, a tapping function is provided at the input end of the optical isolator.

In yet a further embodiment (not shown) another optical element in the form a filter for example can be placed at the output end between the output lens and the isolating means to serve a similar function. Thus in this embodiment a different wavelength other than $\lambda_1$ can be coupled into the output port 144a by providing an input port at the output end to which to launch the signal having the different wavelength.

Of course numerous other embodiments may be envisaged, without departing from the spirit and scope of the invention.

What I claim is:

1. An optical isolator for passing light in a forward direction with greater intensity than reverse directed light, comprising: an isolating means having at least two birefringent crystals, and a non-reciprocal rotating element disposed between the two crystals, the isolating means being disposed between two substantially collimating lenses; an output optical fibre coupled to one of the two lenses and an input optical fibre having a portion having a core with a diameter less than a another portion wherein the core is expanded and the diameter is greater, optically coupled to the other of the two collimating lenses for substantially preventing back reflecting light incident thereupon, at a high incident angle relative to an optical axis of the expanded core fibre from efficiently coupling thereto.

2. An optical isolator as defined in claim 1, wherein one of the two substantially collimating lenses is at an input end, and wherein the other of the two substantially collimating lenses is at an output end, the isolator comprising a plurality of thermally expanded core optical fibres being optically coupled to the lens at the input end and being disposed a predetermined distance from the optical axis of the lens.

3. An optical isolator as defined in claim 2, comprising a plurality of thermally expanded core optical fibres being optically coupled to the lens at the output end, and wherein the fibres are spaced a predetermined distance from the optical axis of the lens.

4. An optical isolator as defined in claim 2, comprising an at least partially reflective optical element being disposed between the isolating means and one of the lenses.

5. An optical isolator for passing light in a forward direction with greater intensity than reverse directed light, comprising: input and output thermally expanded core optical fibres optically aligned and spaced apart; first and second spaced apart collimating lenses disposed between and optically coupled with the expanded core optical fibres; and, isolating means disposed between the spaced apart collimating lenses, said isolating means including two birefringent crystals each having parallel end faces, and non-reciprocal rotating means between the two birefringent crystals, wherein the input optical fibre has a portion having a core with a diameter less than a another portion wherein the core is expanded and the diameter is greater.

6. An optical isolator as defined in claim 5, wherein the first and second substantially collimating lenses are at input and output ends of the isolator, respectively, the isolator comprising a plurality of thermally expanded core optical fibres being optically coupled to the lens at the input end and being disposed a predetermined distance from the optical axis of the lens.

7. An optical isolator as defined in claim 6, comprising a plurality of thermally expanded core optical fibres being optically coupled to the lens at the output end, and wherein the fibres are spaced a predetermined distance from the optical axis of the lens.

8. An optical isolator as defined in claim 5, comprising an at least partially reflective optical element being disposed between the isolating means and one of the lenses to provide at least one of a tapping function and a WDM function.

9. An optical isolator for passing light in a forward direction with greater intensity than reverse directed light, comprising: an isolating means having at least two birefringent crystals, and a non-reciprocal rotating element disposed between the two crystals, the isolating means being disposed between two lenses each for providing a substantially collimated beam of light at an adjacent end of the isolating element; an output optical fibre coupled to one of the two lenses and an input optical fibre having a portion having a core with a diameter less than a another portion wherein the core is expanded and the diameter is greater optically coupled to the other of the two collimating lenses, the expanded core fibre at the input end, for substantially preventing back reflecting light incident thereon at a steep angle with respect to an optical axis of the expanded core from coupling therein.

10. An optical isolator as defined in claim 9, wherein a plurality of thermally expanded core optical fibres are coupled to an input and an output end of the device for providing the isolation of optical signals launched into the optical isolator via the plurality of thermally expanded core optical fibres.

11. An optical isolator as defined in claim 9 having on or more filter elements disposed between the isolating means and one or more of the two lenses.

12. An optical isolator as defined in claim 5, comprising a first and a second at least partially reflective optical elements, one of the optical elements being disposed between the isolating means and one of the lenses at one end, and the other of the optical elements being disposed between the isolating means and a lens at the other end, to provide at least one of a tapping function and a WDM function.

* * * * *